(12) United States Patent
Fong et al.

(10) Patent No.: US 11,328,051 B2
(45) Date of Patent: May 10, 2022

(54) SYSTEM, METHODS, AND DEVICES RESPONSIVE TO AUDIO SIGNATURES

(71) Applicant: PPIP LLC, Tempe, AZ (US)

(72) Inventors: Michael Fong, Chandler, AZ (US); Nerie Hsin-wu Fong, Tempe, AZ (US)

(73) Assignee: PPIP, LLC, Chandler, AZ (US)

( * ) Notice: Subject to any disclaimer, the term of this patent is extended or adjusted under 35 U.S.C. 154(b) by 352 days.

(21) Appl. No.: 16/526,447

(22) Filed: Jul. 30, 2019

(65) Prior Publication Data

US 2021/0034732 A1 Feb. 4, 2021

(51) Int. Cl.
*G06F 21/44* (2013.01)
*G06F 13/10* (2006.01)
*G06F 9/445* (2018.01)

(52) U.S. Cl.
CPC .............. *G06F 21/44* (2013.01); *G06F 9/445* (2013.01); *G06F 13/102* (2013.01)

(58) Field of Classification Search
CPC ......... G06F 21/44; G06F 13/102; G06F 9/445
USPC ..... 710/2, 5, 8, 10, 15, 62, 104; 726/19, 21, 726/27
See application file for complete search history.

(56) References Cited

U.S. PATENT DOCUMENTS

| | | | | |
|---|---|---|---|---|
| 10,096,234 B1 * | 10/2018 | Chun | .................... | G10L 15/08 |
| 2008/0178282 A1 * | 7/2008 | Yoffe | .................... | G06F 21/70 |
| | | | | 726/17 |
| 2011/0314530 A1 * | 12/2011 | Donaldson | .................... | H04L 9/3271 |
| | | | | 726/7 |
| 2012/0246739 A1 * | 9/2012 | Mebed | .................... | G06F 21/6245 |
| | | | | 726/28 |
| 2012/0254987 A1 * | 10/2012 | Ge | .................... | H04L 63/0861 |
| | | | | 726/19 |
| 2015/0135270 A1 * | 5/2015 | Robison | .................... | G06F 21/81 |
| | | | | 726/4 |
| 2015/0264569 A1 * | 9/2015 | Toyota | .................... | G06F 21/34 |
| | | | | 726/7 |
| 2016/0099934 A1 * | 4/2016 | Logue | .................... | H04L 9/0844 |
| | | | | 713/157 |
| 2017/0004684 A1 * | 1/2017 | Slater | .................... | G08B 5/224 |
| 2017/0162216 A1 * | 6/2017 | Margoles | .................... | H04R 17/02 |
| 2019/0096422 A1 * | 3/2019 | Kyomitsu | .................... | H04R 1/406 |

* cited by examiner

*Primary Examiner* — Idriss N Alrobaye
*Assistant Examiner* — Henry W Yu
(74) *Attorney, Agent, or Firm* — Fernando & Partners, LLP (57) ABSTRACT

In accordance with some embodiments, an apparatus for privacy protection is provided. In some embodiments, the apparatus includes a first device including a receiver configured to receive audio signals, a memory configured to store one or more criteria, and a processor configured to process the received audio signals based on the stored criteria in the memory. The apparatus further includes a second device in communication with the first device, wherein the first device, upon detecting one or more audio sound patterns, is configured to send a notification to the second device.

20 Claims, 6 Drawing Sheets

SYSTEM, METHODS, AND DEVICES RESPONSIVE TO AUDIO SIGNATURES

TECHNICAL FIELD

This relates generally to the field of sensing and detecting, and more specifically to an apparatus for detecting audio sound patterns.

BACKGROUND

Users in environments with consistent levels of relatively high ambient noises, e.g., from other people, animals, machines, and vehicles, often experience selective auditory attention, or become accustomed to the consistent levels of relatively high ambient noises. In turn, such users may begin to subconsciously ignore audio alarms that they are meant to pay attention to as a part of their job-function or for personal safety reasons. In other words, selective auditory attention could create problems in situations where the user ignores an important audio signal, e.g., an audio alarm emitted from a medical device in case of patient emergency or a car alarm when a vehicle is broken into. For example, in hospitals where some sources of sounds exist at the same time, the personnel should always be alert for alarms by different medical equipment, e.g., a respirator, a blood transfusion device, etc.

BRIEF DESCRIPTION OF THE DRAWINGS

So that the present disclosure can be understood by those of ordinary skill in the art, a more detailed description can be had by reference to aspects of some illustrative embodiments, some of which are shown in the accompanying drawings.

In accordance with common practice some features illustrated in the drawings cannot be drawn to scale. Accordingly, the dimensions of some features can be arbitrarily expanded or reduced for clarity. In addition, some of the drawings cannot depict all of the components of a given system, method or device. Finally, like reference numerals can be used to denote like features throughout the specification and figures.

DETAILED DESCRIPTION

Accordingly, described herein is an apparatus to detect audio sound patterns and notify authorized users through secured communication. In some embodiments, the apparatus includes a first device including a receiver configured to receive audio signals, a memory configured to store one or more criteria, and one or more processors configured to process the audio signals based on the stored criteria in the memory. In some embodiments, the first device is configured to detect, one or more audio sound patterns from among the audio signals, based on the one or more criteria. In some embodiments, the received audio signals are received from one or more audio sources. In some embodiments, the apparatus further includes a second device in communication with the first device. In some embodiments, the first device, upon detecting one or more audio sound patterns, is configured to send a notification to the second device.

In accordance with some embodiments, a device includes one or more processors, non-transitory memory, and one or more programs; the one or more programs are stored in the non-transitory memory and configured to be executed by the one or more processors and the one or more programs include instructions for performing or causing performance of the operations of any of the methods described herein. In accordance with some embodiments, a non-transitory computer readable storage medium has stored therein instructions which when executed by one or more processors of a device, cause the device to perform or cause performance of the operations of any of the methods described herein. In accordance with some embodiments, a device includes means for performing or causing performance of the operations of any of the methods described herein.

Reference will now be made in detail to embodiments, examples of which are illustrated in the accompanying drawings. In the following detailed description, numerous specific details are set forth in order to provide a thorough understanding of the some described embodiments. However, it will be apparent to one of ordinary skill in the art that the some described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe some elements, these elements should not be limited by these terms. These terms are only used to distinguish one element from another. For example, a first contact could be termed a second contact, and, similarly, a second contact could be termed a first contact, without departing from the scope of the some described embodiments. The first contact and the second contact are both contacts, but they are not the same contact, unless the context clearly indicates otherwise.

The terminology used in the description of the some described embodiments herein is for the purpose of describing particular embodiments only and is not intended to be limiting. As used in the description of the some described embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting", depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

It should be appreciated that in the development of any actual embodiment (as in any development project), numerous decisions must be made to achieve the developers' specific goals (e.g., compliance with system and business-related constraints), and that these goals will vary from one embodiment to another. It will also be appreciated that such development efforts might be complex and time consuming but would nevertheless be a routine undertaking for those of ordinary skill in the art of image capture having the benefit of this disclosure.

Figure 1A:
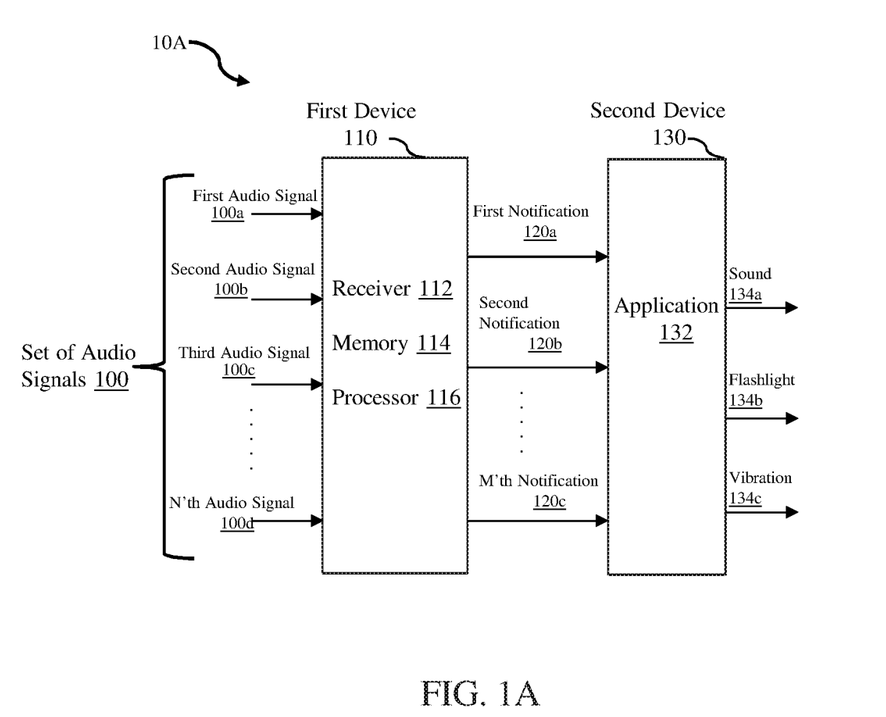
FIGS. 1A-1B are block diagrams of an audio signature sensing apparatus in accordance with some embodiments.

Referring to FIG. 1A, a simplified block diagram of an audio signature sensing system 10A is illustrated, in accordance with some embodiments. In some embodiments, the audio signature sensing system 10A includes a first device 110 and a second device 130. In some embodiments, the first device 110 is in communication with the second device 130 through a network (not shown). The first device 110 and the second device 130 can communicate through a wireless network, e.g., a Wi-Fi network, an LTE network, etc. In some embodiments, the first device is a pager. In some embodiments, the first device is a Personal Digital Assistance (PDA). In some embodiments, the first device 110 is a standalone device to monitor audio signals from surroundings. In some embodiments, the first device 110 is an aperture that can be connected to the second device 130. For example, the first device 110 can be an aperture capable of detecting audio signals from the surrounding which attaches to a smartphone. In some embodiments, the first device 110 includes a microphone to detect the audio signals. In some embodiments, the first device 110 uses any suitable method to detect vibrations caused by the audio signals.

In some embodiments, the first device 110 detects audio signals from the surrounding environment. The audio signals, e.g., acoustic waves, are longitudinal waves that propagate by means of adiabatic compression and decompression. The longitudinal waves are waves that have the same direction of vibration as their direction of travel. In some embodiments, an acoustic wave is a mechanical wave in which pressure variation propagates through a material. In some embodiments, audio signals. e.g., acoustic waves, transfer sound energy from one point to another without any net movement of the air particles or other media they pass through.

In some embodiments, the first device includes a receiver 112, a memory 114 and one or more processors 116. In some embodiments, the receiver 112 is configured to receive audio signals from the surrounding. In some embodiments, the one or more processors 116 are in communication with the memory 114 and the receiver 112. The receiver 112 can include a microphone or any suitable device to detect audio signals. In some embodiments, the receiver 112 receives a set of audio signals 100. In some embodiments, the set of audio signals 100 includes a first audio signal 100a, a second audio signal 100b, a third audio signal 110c, . . . , and an n'th audio signal 100d. In some embodiments, the set of audio signals 100 is received from one or more sources.

In some embodiments, the first device 110 includes the memory 114 which is configured to store one or more criteria. The one or more criteria can be used to detect certain types of audio signals from the set of audio signals 100 received by the receiver 112 associated with the first device 110. In some embodiments, the memory 114 stores instructions on how to use the one or more criteria. In some embodiments, the memory 114 is configured to store further instructions to respond to detecting certain types of audio signals received from the surrounding. In some embodiments, the first device 110 includes the one or more processors 116 which are configured to process the received audio signals 100 based on the stored criteria in the memory 114 associated with the first device 110.

In some embodiments, the first device 110 performs an authentication and authorization 118 process before sending a notification. In some embodiments, the authentication and authorization 118 is performed by the one or more processors 116. In some embodiments, the authentication and authorization 118 is performed by a separate processor associated with the first device 110. In some embodiments, once the first device 110 determines that the second device 130 is an authorized device, the notification is sent to the second device 130. In some embodiments, once the first device 110 determines that the second device 130 is not an authorized device, the notification is not sent to the second device 130. In some embodiments, the first device 110, upon detecting one or more audio sound patterns, is configured to send the notification, e.g., a first notification 120a, a second notification 120b, . . . , an m'th notification 120c, to the second device 130.

According to some embodiments, the one or more criteria include a frequency of the audio signals. In some embodiments, the one or more criteria include an amplitude of the audio signals. In some embodiments, the one or more criteria include a speed of sound of the audio signals. In some embodiments, the one or more criteria include a sound pattern of the audio signals. In some embodiments, the one or more criteria include a direction of the audio signals. In some embodiments, one or more audio sound patterns are stored in the memory 114 associated with the first device 110. In some embodiments, the one or more processors 116 determine whether each of the set audio signals 100, e.g., the first audio signal 100a, the second audio signal 100b, the third audio signal 110c, and the n'th audio signal 110d, includes an audio sound pattern that satisfies the one or more criteria stored in the memory 114.

In some embodiments, once the one or more processors 116 associated with the first device 110 determine that one or more received audio signals include at least one audio sound pattern that satisfies the one or more criteria stored in the memory 114, the first device 110 notifies the second device 130 in communication with the first device 110. In some embodiments, the first device 110 sends one notification for each detected audio sound pattern detected by the first device 110.

In some embodiments, the first device 110 notifies more than one second device 130 in communication with the first device 110. In some embodiments, the second device 130 is a smartphone. In some embodiments, the second device 130 is a smart watch. In some embodiments, the second device 130 is a laptop or a personal computer. In some embodiments, the second device 130 is associated with an authorized user. For example, in hospitals where some sources of sounds exist at the same time, the personnel should always be alert for alarms by different medical equipment, e.g., a respirator, a blood transfusion device, etc. However, authorized users, e.g., hospital personnel, in environments with consistent levels of relatively high ambient noises, e.g., from other people and outside vehicles, often experience selective auditory attention, or become accustomed to the consistent levels of relatively high ambient noises. In turn, such users may begin to subconsciously ignore audio alarms from the medical equipment. As another example, in a parking lot there may be occasional vehicle alarm sounds. In such situations, authorized personnel of the parking lot may become ignorant of the noises, e.g., the selective auditory attention. Such selective auditory attention caused by the occasional alarm could create problems if the authorized personnel ignores a car alarm when a vehicle is broken into.

As an example, and not by way of limitations, an audio sound monitor is placed in a hospital room to monitor the surrounding sounds. The audio sound monitor performs as the first device 110 of the apparatus 10A and detects sound patterns associated with the medical equipment among people's voices and other audio signals. Thus, in case of an emergency, the audio sound monitor detects the sound pattern and sends a notification to nurses and/or doctors. In some embodiments, the audio sound monitor sends notification to a user's personal communication device, e.g., a smartphone, a smart watch, a laptop, a personal computer, etc. In some embodiments, the first device 110 further sends separate notification(s) to emergency help centers, e.g., medical emergency centers, police centers, etc. As an example, the first device 110 detects a beeping sound from and matches an audio sound pattern associated with a heart monitor.

In some embodiments, the notification is a text message to the second device 130. In some embodiments, the notification is an email to an authorized user associated with the second device 130. In some embodiments, in association with sending, e.g., transmitting, the notification to the second device 130, an application 132 on the second device is launched. In some embodiments, the application 132 produces a pre-determined sound 134a. For example, the application 132 can cause the second device 130 to beep several times. In some embodiments, the application 132 produces a flashing light 134b. In some embodiments, the application 132 produces a vibration 134c. In some embodiments, the application 132 produces a combination of the above-mentioned responses or any other responses. In some embodiments, the application 132 creates one or more reminders to the authorized user by repeating the same procedures, e.g., sound, flashing light, vibration, etc. In some embodiments, the first device 110 transmits a separate notification for each detected audio sound pattern. As an example, an application is launched on a second device that vibrates the second device. The vibration may indicate a heart monitor device. A second vibration, or any other response, may be used to indicate an alarm associated with a respirator. In some embodiments, the first device 110 associates the sound pattern to a characteristic of the physical setting in the user environment. As an example, the characteristic can be a geolocation of a device, e.g., a room number, a status of a device, e.g., an equipment running low on IV), etc.

Figure 1B:
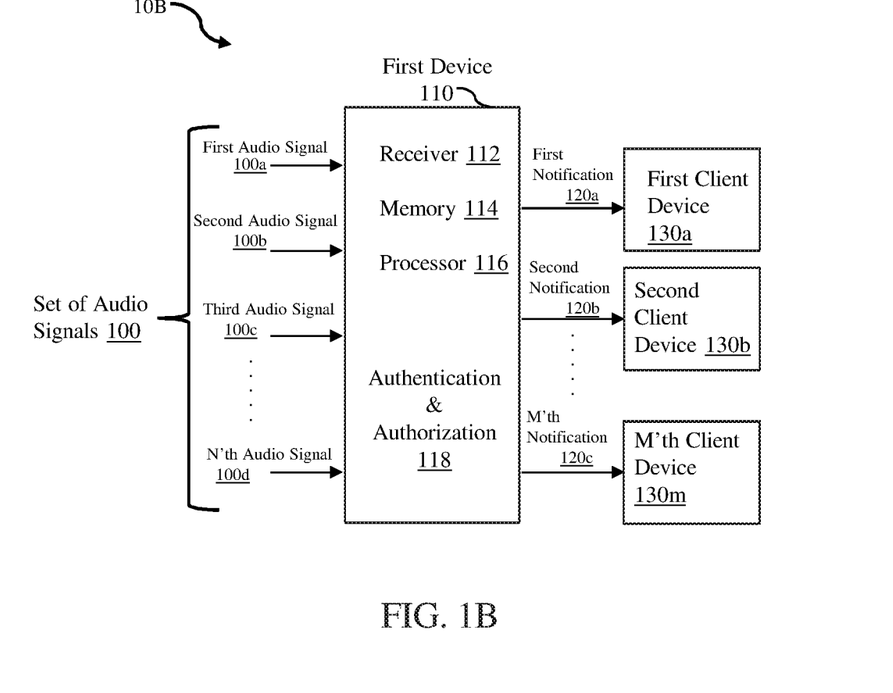

Referring to FIG. 1B, a simplified block diagram of an audio signature sensing system 10B is illustrated, in accordance with some embodiments. In some embodiments, the first device 110 notifies, e.g., the first notification 120a, the second notification 120b, the m'th notification 120c, more than one second devices, e.g., a first client device 130a, a second client device 130b, . . . , an m'th client device 130m. In some embodiments, the more than one second devices, e.g., the first client device 130a, the second client device 130b, the m'th client device 130m, are in communication with the first device 110. In some embodiments, at least one of the second devices 130 is a smartphone. In some embodiments, at least one of the second devices 130 is a smart watch. In some embodiments, at least one of the second devices 130 is a laptop or a personal computer.

Figure 2:
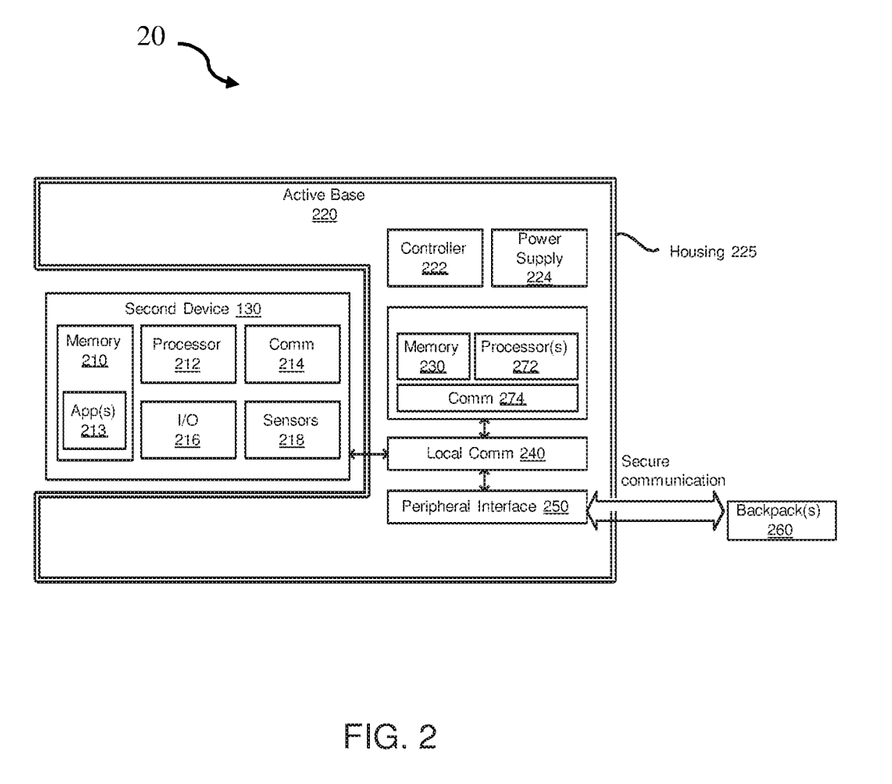
FIG. 2 is an illustration of an audio signature sensing device in accordance with some embodiments.

Referring to FIG. 2, an apparatus 20 in communication with the first device, e.g., the audio pattern monitor, is illustrated, according to some embodiments. Accordingly, the apparatus 20 includes an active base 220 and the second device 130. In some embodiments, the active base 220 is configured to protect the second device 130 mechanically and against tracking or spying.

In some embodiments, the active base 220 includes a housing 225 arranged to hold the second device 130. In some embodiments, the housing 225 includes a plurality of components mateable with one another. In other words, the plurality of components, once mated with one another, form an assembly to hold and/or providing structural support of the second device 130. The housing 225 allows the authorized user to insert the second device 130 into the active base 220 for more protection of work-related sensitive information (e.g., in a work mode) or take the second device 130 out of the active base 220 for less monitoring of the personal communication by enterprise (e.g., in a personal mode).

The active base 220 can have one or more moveable components (e.g., a hood) operable to slide to one or more positions (e.g., up or down) as well as non-moveable components. In such embodiments, the one or more moveable components, when in a first position (e.g., hood pushed down), are mateable (e.g., mechanically and/or electrically) with the non-moving components to form a housing assembly. The housing assembly forms an enclosure that at least partially support and hold the second device 130. When in the first position, the housing 225, along with other components of the active base 220, protects the second device 130 against tracking or spying, e.g., by audio jamming, camera covering, and/or RF shielding, etc. When the one or more moveable components of the housing assembly are in a second position (e.g., a hood slid up), a user can take the second device 130 out of the housing 225 and place the second device 130 in a non-protected mode.

In some embodiments, the active base 220 includes a peripheral interface 250 (e.g., a backpack interface) to connect to a supplemental functional device 260 (e.g., a backpack). A supplemental functional device, as described herein, is a device connectable to the second device 130 through the active base 220 and provides supplemental functional functions to the second device 130. The peripheral interface 250 connects the supplemental functional device 260 to the active base 220 and a local communication device 240 further connects the peripheral interface 250 to the second device 130. As such, the peripheral interface 250 is a modular interface for the backpack 260, which is a detachable device that allows supplemental hardware and software functionalities to be provided to the user of the active base 220. In some embodiments, the active base 220 includes one or more processors 272.

In some embodiments, the active base 220 includes a local communication device 240 coupled to the peripheral interface 250 and supported by the housing 225. In some embodiments, the local communication device 240 includes a personal communication device interface modem (e.g., a WiFi modem, a BT/BLE radio, an infrared radio, an NFC radio, a Lightning® (a registered trademark of Apple Inc., Cupertino, Calif.) connector, etc.) operable to provide a communication channel (e.g., wirelessly or via physical connection) between the peripheral interface 250 and the second device 130. In one direction, the communication channel carries information from the second device 130 to the active base 220 for validation. In the other direction, the communication channel carries information from the supplemental functional device 260 via the peripheral interface 250 to the second device 130 in order to supplement the functionality of the second device 130.

In some embodiments, the active base 220 includes a controller 222 coupled to the peripheral interface 250 and the local communication device 240. Embodiments of the controller 222 include hardware, software, firmware, or a combination thereof. In some embodiments, the controller 222 is operable to manage the communication channel between the second device 130 and the supplemental functional device 260 and through the local communication device 240 and the peripheral interface 250. In other words, the controller 222 manages a segment of the communication channel between the second device 130 and the active base 220 through the management of the local communication device 240, and the controller 222 manages a segment of the communication channel between the active base 220 and the supplemental functional device 260 through the management of the peripheral interface 250.

In addition to managing the communication channel, the controller 222 logs data in a secure area of the active base 220. Logging data in the secure area of the active base 220 has the advantage of providing trustworthy status reports of the second device 130 for analysis in case the second device 130 has been or potentially has been compromised. For example, many high-value enterprises invest significantly to implement tight monitoring and access control within their own networks but lose visibility and control to external networks such as the cellular networks or WiFi hotspots. Once a smartphone is compromised, the status report from the phone operating system may not be trustworthy. By logging data in a secure area of the apparatus, reliable status reports can be generated for Enterprise Mobility Management (EMM), and EMM can then rely on the reliable information to limit the threat spread.

In some embodiments, the active base 220 includes a power supply 224. The power supply 224 supplies power to the peripheral interface 250, the local communication device 240, and/or the controller 222. In some embodiments, the power supply 224 includes at least one of a battery, a charging socket, a USB connector, a power plug, and/or a power socket. In some embodiments, the power supply 224 includes a connector for a battery. In some embodiments, the power supply 224 includes a plurality of power supplying components, e.g., one battery providing power to the peripheral interface 250, a power plug providing power to the local communication device 240 and/or the controller 222, etc. The plurality of power supply components can be connected to be charged together, charged separately, aggregating power to supply to one or more hardware electronic components of the active base 220, or separately providing power to one or more hardware electronic components of the active base 220.

In some embodiments, the second device 130 held by the active base 220 includes one or more processors 212, one or more communication devices 214, an input/output interface 216, sensors 218, memory 210, and applications 213, which further includes instructions stored in the memory 210 and executed by the one or more processors 212. In some embodiments, the second device 130 is a portable communications device, such as a mobile phone, a wearable device, a tablet, a laptop computer, a digital media player, an electronic reader, or the like. In some embodiments, the second device 130 is a non-portable device, such as a desktop computer, a data storage device, a smart TV, a video game console, a smart home appliance or the like that is capable of storing, transmitting, and receiving data. It will be appreciated that the components, devices or elements illustrated in and described with respect to FIG. 2 below may not be mandatory and thus some may be omitted in certain embodiments. Additionally, some embodiments can include further or different components, devices or elements beyond those illustrated in and described with respect to FIG. 2.

In some embodiments, the one or more processors 212 is coupled to the one or more communication devices 214 in order to control the communication using the one or more communication devices 214, in accordance with some embodiments. In addition to controlling communication, the one or more processors 212 processes data and executes applications 213, in accordance with some embodiments. In some embodiments, the one or more processors 212 includes one or more chips and/or chipsets embodied in a variety of forms. For example, the one or more processors 212 can be embodied as some hardware-based processing means such as a microprocessor, a coprocessor, a controller, or other computing devices including integrated circuits, such as an ASIC (application specific integrated circuit), an FPGA (field programmable gate array), some combination thereof, or the like. The one or more processors 212 communicate with each other and collectively perform one or more functionalities. In some embodiments, the one or more processors 212 can be configured to execute instructions that can be stored in the memory 210 or that can be otherwise accessible to the one or more processors 212. As such, whether configured by hardware or by a combination of hardware, firmware, and software, the one or more processors 212 is capable of performing operations according to some embodiments.

In some embodiments, the memory 210 includes one or more memory devices, including fixed and/or removable memory devices. In some embodiments, the memory 210 provides a non-transitory computer-readable storage medium for storing computer program instructions, e.g., the application(s) 213, to be executed by the one or more processors 212. In some embodiments, the memory 210 exchanges information with one or more of the one or more processors 212, the input/output interface 216, the communication devices 214, or sensors 218 via a bus. In some embodiments, the applications 213 stored in the memory 210 include an application for exchanging information between the second device 130 and an external electronic device, e.g., the active base 220. The information exchange includes, for example, transmitting information obtained by the communication device 214 and/or sensors 218 to an external electronic device, e.g., the active base 220, or receiving information from the external electronic device, e.g., the information gathered by the supplemental functional device 260 and relayed by the active base 220 via the peripheral interface 250 and the local communication devices 240.

In some embodiments, the input/output interface 216 provides a channel for input/output data between the one or more processors 212 and input/output peripheral devices, such as a display, a keyboard, a mouse, a pen, microphones, cameras, and/or speakers of the second device 130. In some embodiments, the peripheral devices are connected to the input/output interface 216 wirelessly, e.g., via the one or more communication devices 214.

In some embodiments, the one or more communication devices 214 connect the second device 130 and an external electronic device wirelessly or through a wired connection. In some embodiments, the external electronic device is the active base 220, such that the one or more communication devices 214 connect to the active base 220 wirelessly or through a wired communication. The wireless communication includes at least one of, for example, Wi-Fi (e.g., IEEE 802.11a, IEEE 802.11, IEEE 802.11g, IEEE 802.11n, and/or IEEE 802.11ac), Bluetooth (BT), Bluetooth Low Energy (BLE), Near Field Communication (NFC), Global Positioning System (GPS), and/or cellular communication, including but not limited to long term evolution (LTE), wideband code division multiple access (W-CDMA), code division multiple access (CDMA), time division multiple access (TDMA), or Global System for Mobile Communications (GSM). The wired connections include at least one of, for example, a Universal Serial Bus (USB) connector, a High Definition Multimedia Interface (HDMI) connector, and/or a Lightning® (a registered trademark of Apple Inc. of Cupertino, Calif.) connector.

In some embodiments, the second device 130 includes sensors 218, such as one or more accelerometers, gyroscopes, and/or magnetometers (e.g., as part of an inertial measurement unit (IMU)) for obtaining information concerning the position (e.g., altitude) of the second device 130, light sensors, or acoustic sensors. In some embodiments, the sensors 218 are coupled to the input/output interface 216, such that the information collected by the sensors 218 are passed to the one or more processors 212 by the input/output interface 216 for further processing. For example, the input device camera uses light sensors for light sensing.

In some embodiments, the second device 130 is in communication with the supplemental functional device 260, e.g., the backpack, and/or a remote secure validator in a cloud (not shown) through secure communication. In some embodiments, the supplemental functional device 260 includes a processing element, such as an ASIC (Application Specific Integrated Circuit), portions or circuits of individual processor cores, entire processor cores, individual processors, programmable hardware devices such as a field programmable gate array (FPGA), and/or larger portions of systems that include multiple processors. In some embodiments, the backpack 260 includes one or more sensors and an RF detection device.

The information collected by the sensor(s) 218 and/or the RF detection device are processed by the processing element and communicated to the peripheral interface via the secure communication, e.g., through wired connection between the peripheral interface 250 and an interface, e.g., a backpack bus, on the supplemental functional device 260. Upon receiving the information, the peripheral interface 250 sends the information to the local communication device 240 under the management of the controller 222, and the controller 222 further directs the information to the second device 130. The additional information gathered by the supplemental functional device 260 supplements the functionality of the second device 130. Moreover, in some embodiments, the active base 220 analyzes the additional information gathered by the supplemental functional device 260 and uses the information to further determine if the second device 130 has been compromised.

For example, the sensors 218 on the backpack 260 can be biosensors for environmental monitoring, clinical diagnostic, audio sensors, and/or food analysis. The processing element conducts preprocessing of the data gathered by the sensors and prepares a summary of the data. The processing element directs the summary data to the second device 130 through the secure communication including the interface, the peripheral interface 250, and the local communication device 240. Further, the active base 220 determines, based on the environmental monitoring, e.g., the presence of chemical, RF energy, infrared wave, a different set of user biometrics data, etc., whether the second device 130 has been compromised. Thus, the additional data provided by the supplemental functional device 260 not only supplements the functionality of the second device 130, but also enhances the active base's 220 compromise detection capability.

In some embodiments, the local communication device 240 receives the information and passes to a validation engine. In some embodiments, the validation engine is stored in the memory 230 to be executed by controller 222 and validates one of more components of the second device 130 based on the information received from the local communication device 240.

In some embodiments, the validation engine receives the information associated with the second device 130 and validates the information locally. In some embodiments, the information associated with the second device 130 is transmitted to a remote secure validator, e.g., a remove secure validator on a remote server or a private cloud, for further validation remotely. In such embodiments, the active base 220 includes a remote communication device supported by the housing to transmit the information associated with the user equipment to the remote secure validator. In some embodiments, the remote secure validator is a trusted source, such that the communication channel between the remote communication device and the remote secure validator is authenticated and secure. The remote communication device, in some embodiments, includes one or more wireless communication devices, such as a GPS module, a cellular communication module, and a WiFi radio. The remote communication device uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), wideband code division multiple access (W-CDMA), code division multiple access (CDMA), time division multiple access (TDMA), and/or Wi-Fi (e.g., IEEE 802.11a, IEEE 802.11b, IEEE 802.11g, IEEE 802.11n, and/or IEEE 802.11ac), or any other suitable communication protocol, including communication protocols not yet developed as of the filing date of this document.

In some embodiments, the validation engine includes an application validation card, a local communication validation card, e.g., GPS validation card, a sensor validation card, and a remote communication validation card. In some embodiments, the application validation card includes one or more processing elements, such as ASIC, portions or circuits of individual processor cores, entire processor cores, individual processors, programmable hardware devices such as an FPGA, and/or larger portions of systems that includes one or more processors. In some embodiments, the application validation card includes memory, which further includes one or more memory devices. In some embodiments, the memory includes a non-transitory computer-readable storage medium that can store computer program instructions to be executed by the processor. In some embodiments, the application validation card serves as an application validation engine to validate operational integrity of an application on the second device 130.

Figure 3:
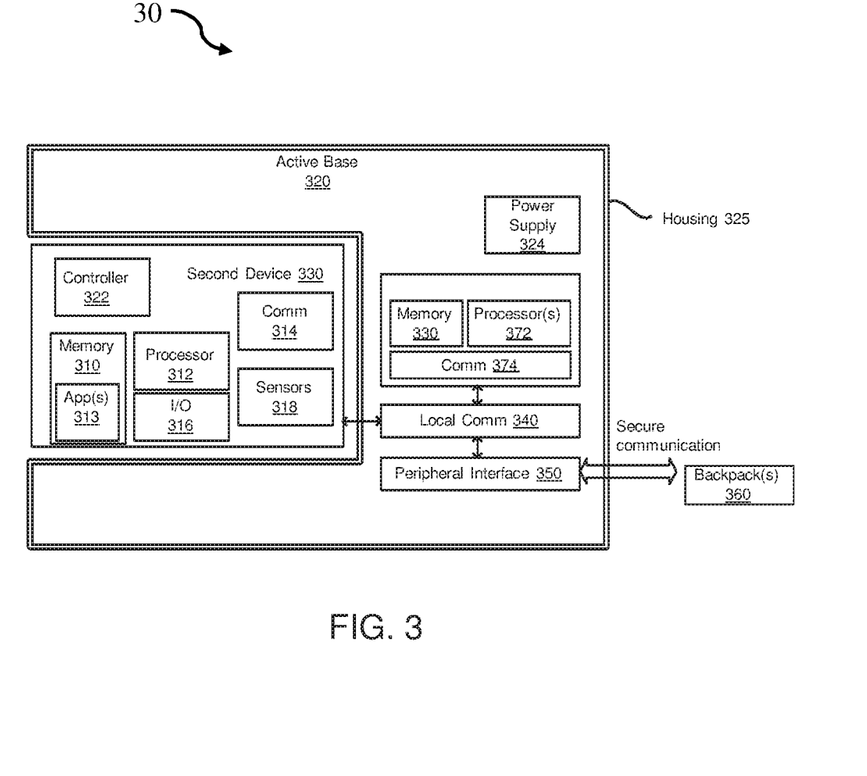
FIG. 3 is an illustration of an audio signature sensing device in accordance with some embodiments.

Referring to FIG. 3, an apparatus 30 in communication with the first device, e.g., the audio pattern monitor, is shown, according to some embodiments. In some embodiments, the second device 130 includes a controller 322. Embodiments of the controller 322 include hardware, software, firmware, or a combination thereof. In some embodiments, the controller 322 is operable to manage the communication channel between the second device 130 and the first device 110 and through the local communication device 340 and the peripheral interface 350. In other words, the controller 322 manages a segment of the communication channel between the second device 130 and the first device 110 through the management of the local communication device 340. In addition to managing the communication channel, the controller 322 logs data in a secure area of the active base 320. Logging data in the secure area of the active base 320 has the advantage of providing trustworthy status reports of the second device 130 for analysis in case the second device 130 has been or potentially has been compromised. For example, many high-value enterprises invest significantly to implement tight monitoring and access control within their own networks but lose visibility and control to external networks such as the cellular networks or WiFi hotspots. Once a smartphone is compromised, the status report from the phone operating system may not be trustworthy. By logging data in a secure area of the apparatus, reliable status reports can be generated for EMM, and EMM can then rely on the reliable information to limit the threat spread.

In some embodiments, the active base 320 includes a peripheral interface 350 (e.g., a backpack interface) to connect to a supplemental functional device 360 (e.g., a backpack). A supplemental functional device, as described herein, is a device connectable to the second device 130 through the active base 320 and provides supplemental functional functions to the second device 130. The peripheral interface 350 connects the supplemental functional device 360 to the active base 320 and a local communication device 340 further connects the peripheral interface 350 to the second device 130. As such, the peripheral interface 350 is a modular interface for the backpack 360, which is a detachable device that allows supplemental hardware and software functionalities to be provided to the user of the active base 320. In some embodiments, the active base 320 includes one or more processors 372.

In some embodiments, the active base 320 includes a local communication device 340 coupled to the peripheral interface 350 and supported by the housing 325. In some embodiments, the local communication device 340 includes a personal communication device interface modem (e.g., a WiFi modem, a BT/BLE radio, an infrared radio, an NFC radio, a Lightning® (a registered trademark of Apple Inc., Cupertino, Calif.) connector, etc.) operable to provide a communication channel (e.g., wirelessly or via physical connection) between the peripheral interface 350 and the second device 130. In one direction, the communication channel carries information from the second device 130 to the active base 320 for validation. In the other direction, the communication channel carries information from the supplemental functional device 360 via the peripheral interface 350 to the second device 130 in order to supplement the functionality of the second device 130.

In some embodiments, the local communication device 340 receives the information and passes to a validation engine. In some embodiments, the validation engine is stored in the memory 130 to be executed by controller 322 and validates one of more components of the second device 130 based on the information received from the local communication device 340. In some embodiments, the active base 320 includes one or more processors 372.

In some embodiments, the active base 320 includes a power supply 324. The power supply 324 supplies power to the peripheral interface 350, the local communication device 340, and/or the controller 322. In some embodiments, the power supply 324 includes at least one of a battery, a charging socket, a USB connector, a power plug, and/or a power socket. In some embodiments, the power supply 324 includes a connector for a battery. In some embodiments, the power supply 324 includes a plurality of power supplying components, e.g., one battery providing power to the peripheral interface 350, a power plug providing power to the local communication device 340 and/or the controller 322, etc. The plurality of power supply components can be connected to be charged together, charged separately, aggregating power to supply to one or more hardware electronic components of the active base 320, or separately providing power to one or more hardware electronic components of the active base 320.

In some embodiments, the second device 130 held by the active base 320 includes one or more processors 312, one or more communication devices 314, an input/output interface 316, sensors 318, memory 310, and applications 313, which further includes instructions stored in the memory 310 and executed by the one or more processors 312. In some embodiments, the second device 130 is a portable communications device, such as a mobile phone, a wearable device, a tablet, a laptop computer, a digital media player, an electronic reader, or the like. In some embodiments, the second device 130 is a non-portable device, such as a desktop computer, a data storage device, a smart TV, a video game console, a smart home appliance or the like that is capable of storing, transmitting, and receiving data. It will be appreciated that the components, devices or elements illustrated in and described with respect to FIG. 3 below may not be mandatory and thus some may be omitted in certain embodiments. Additionally, some embodiments can include further or different components, devices or elements beyond those illustrated in and described with respect to FIG. 3.

In some embodiments, the one or more processors 312 is coupled to the one or more communication devices 314 in order to control the communication using the one or more communication devices 314, in accordance with some embodiments. In addition to controlling communication, the one or more processors 312 processes data and executes applications 313, in accordance with some embodiments. In some embodiments, the one or more processors 312 includes one or more chips and/or chipsets embodied in a variety of forms. For example, the one or more processors 312 can be embodied as some hardware-based processing means such as a microprocessor, a coprocessor, a controller, or other computing devices including integrated circuits, such as an ASIC (application specific integrated circuit), an FPGA (field programmable gate array), some combination thereof, or the like. The one or more processors 312 communicate with each other and collectively perform one or more functionalities. In some embodiments, the one or more processors 312 can be configured to execute instructions that can be stored in the memory 310 or that can be otherwise accessible to the one or more processors 312. As such, whether configured by hardware or by a combination of hardware, firmware, and software, the one or more processors 312 is capable of performing operations according to some embodiments.

In some embodiments, the memory 310 includes one or more memory devices, including fixed and/or removable memory devices. In some embodiments, the memory 310 provides a non-transitory computer-readable storage medium for storing computer program instructions, e.g., the application(s) 313, to be executed by the one or more processors 312. In some embodiments, the memory 310 exchanges information with one or more of the one or more processors 312, the input/output interface 316, the communication devices 314, or sensors 318 via a bus. In some embodiments, the applications 313 stored in the memory 310 include an application for exchanging information between the second device 130 and an external electronic device, e.g., the active base 320. The information exchange includes, for example, transmitting information obtained by the communication device 314 and/or sensors 318 to an external electronic device, e.g., the active base 320, or receiving information from the external electronic device, e.g., the information gathered by the supplemental functional device 360 and relayed by the active base 320 via the peripheral interface 350 and the local communication devices 340.

In some embodiments, the input/output interface 316 provides a channel for input/output data between the one or more processors 312 and input/output peripheral devices, such as a display, a keyboard, a mouse, a pen, microphones, cameras, and/or speakers of the second device 130. In some embodiments, the peripheral devices are connected to the input/output interface 316 wirelessly, e.g., via the one or more communication devices 314.

In some embodiments, the one or more communication devices 314 connect the second device 130 and an external electronic device wirelessly or through a wired connection. In some embodiments, the external electronic device is the active base 320, such that the one or more communication devices 314 connect to the active base 320 wirelessly or through a wired communication. The wireless communication includes at least one of, for example, Wi-Fi (e.g., IEEE 802.11a, IEEE 802.11b, IEEE 802.11g, IEEE 802.11n, and/or IEEE 802.11ac), Bluetooth (BT), Bluetooth Low Energy (BLE), Near Field Communication (NFC), Global Positioning System (GPS), and/or cellular communication, including but not limited to long term evolution (LTE), wideband code division multiple access (W-CDMA), code division multiple access (CDMA), time division multiple access (TDMA), or Global System for Mobile Communications (GSM). The wired connections include at least one of, for example, a Universal Serial Bus (USB) connector, a High Definition Multimedia Interface (HDMI) connector, and/or a Lightning® (a registered trademark of Apple Inc. of Cupertino, Calif.) connector.

In some embodiments, the second device 130 includes sensors 318, such as one or more accelerometers, gyroscopes, and/or magnetometers (e.g., as part of an inertial measurement unit (IMU)) for obtaining information concerning the position (e.g., altitude) of the second device 130, light sensors, or acoustic sensors. In some embodiments, the sensors 318 are coupled to the input/output interface 316, such that the information collected by the sensors 318 are passed to the one or more processors 312 by the input/output interface 316 for further processing. For example, the input device camera uses light sensors for light sensing.

In some embodiments, the second device 130 can be attached to the first device, e.g., the active base 320, in which the housing 325 of the active base 320 holds the second device 130. In some embodiments, the active base 320 determines whether the second device 130 is an authorized device.

In some embodiments, the active base 320 transmits, through the local communication device 340, the notification to the second device. In some embodiments, the transmission takes place in accordance with a determination that the second device 130 is an authorized device. In some embodiments, the active base 320 forgoes transmitting the notification in accordance with a determination that the second device 130 is not an authorized device. As an example, at a hospital, a morning shift personnel would come in to work and place his phone, e.g., the second device 130, in the active base 320. By the end of the day, the morning shift personnel would take his phone out of the active base 320 and a night shift personnel would place her phone, e.g., a second device 130, into the same active base 320. By placing any phone in the active bae 320, the active base 320 is able to verify the phone user is an authorized user and a secure communication channel is established between the active base 320 and the phone, e.g. the second device 130, upon successful authentication/authorization. In other words, the personnel of the phone, e.g., the second device 130, held by the active base 320 would be the authorized user to receive the notification.

In some embodiments, a third device is attached to the housing 325. In some embodiments, the audio sensors 318 are in the third device. In some embodiments, a secure channel between the third device and the active base 320 is established. In some embodiments, the audio signal is received through the secure channel.

Figure 4:
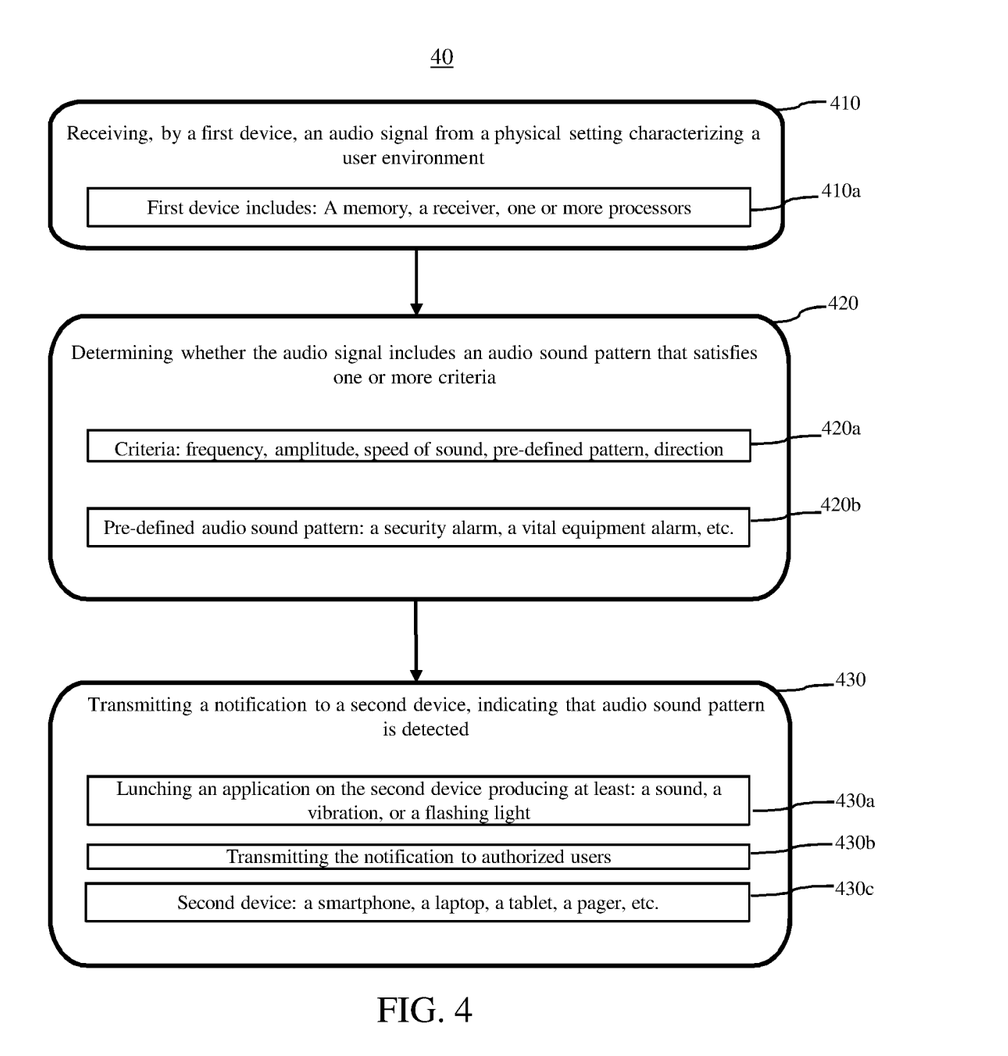
FIG. 4 is a flowchart illustrating a method of audio signature sensing in accordance with some embodiments.

FIG. 4 is a flowchart representation of a method 40 of detecting audio sound patterns and notifying authorized users, in accordance with some embodiments. As represented by block 410, the method 40 includes receiving, by a first device, audio signals from a physical setting characterizing a user environment. In some embodiments, the first device is a pager. In some embodiments, the first device is a standalone device to monitor acoustic waves of surroundings. In some embodiments, the first device is an aperture that can be connected to a second device. For example, the first device can be an aperture capable of detecting audio signals from the surrounding that attaches a smartphone. In some embodiments, the first device uses a microphone or any suitable method to detect the audio signals. As represented at block 410a, the first device includes a receiver which is configured to receive audio signals, a memory which is configured to store one or more criteria, and one or more processors which are configured to process the received audio signals based on the stored criteria in the memory. The receiver can include a microphone or any suitable device to detect audio signals. As represented at block 420, the method 40 includes determining whether the audio signals include an audio sound pattern that satisfies one or more criteria. In some embodiments, the one or more criteria can be used to detect certain types of audio signals from a plurality of audio signals received by the receiver associated with the first device. In some embodiments, the memory stores instructions on how to use the one or more criteria. In some embodiments, the memory is configured to store further instructions to respond to detecting certain types of audio signals received from the surrounding. According to some embodiments, the one or more criteria include a frequency of the audio signals, an amplitude of the audio signals, a speed of sound of the audio signals, a sound pattern of the audio signals, or a direction of the audio signals, as shown at block 420a. As shown at block 420b, in some embodiments, the audio sound pattern is a car security alarm, or a medical equipment emergency alarm.

In some embodiments, the method 40 further includes transmitting a notification to the second device, indicating that the audio sound pattern is detected, as represented at block 430. In some embodiments, the second device is in communication with the first device. In some embodiments, the first device sends one notification for each detected audio sound pattern detected by the first device. In some embodiments, the first device notifies more than one second device in communication with the first device. In some embodiments, the notification is a text message to the second device. In some embodiments, the notification is an email to an authorized user associated with the second device.

In some embodiments, in association with sending, e.g., transmitting, the notification to the second device, an application on the second device is launched, as represented at block 430*a*. In some embodiments, the application produces a sound, or a vibration, or a flashing light. In some embodiments, the application produces a combination of the above-mentioned responses. In some embodiments, the application creates one or more reminders to the user by repeating the same procedures, e.g., sound, flashing light and/or vibration. In some embodiments, the first device transmits a separate notification for each detected audio sound pattern. In some embodiments, the first device transmits the notification to the second device which is associated with an authorized user, as shown at block 430*b*. In some embodiments, the second device is a smartphone, a smart watch, a tablet, a personal computer, a wearable communication device, a page, etc., as shown at block 430*c*.

Figure 5:
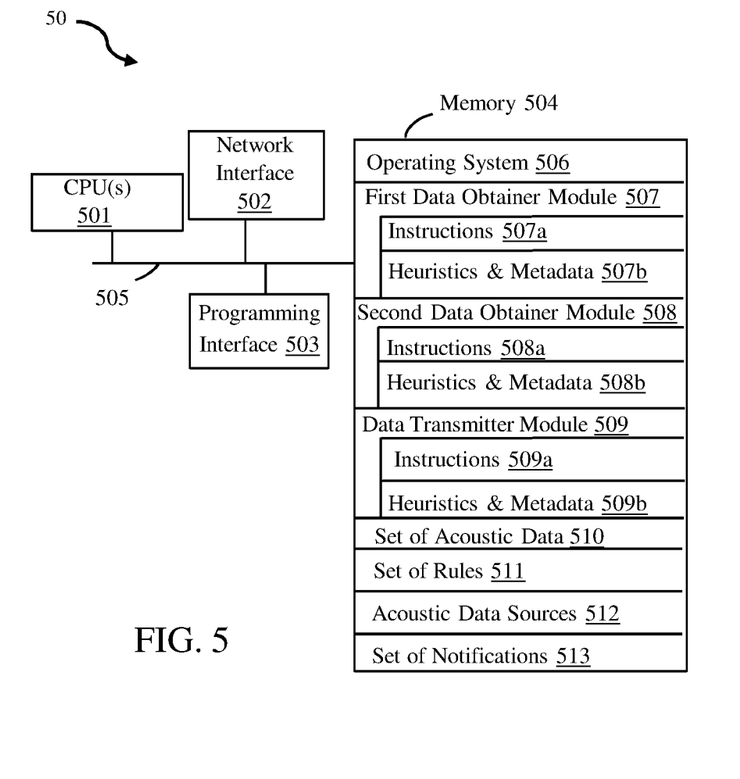
FIG. 5 is an illustration of an audio signature sensing system in accordance with some embodiments.

FIG. 5 is a block diagram of a server system 50 enabled with some modules associated with and/or included in a system for detecting audio sound patterns and notifying authorized users in accordance with some embodiments. In other words, in some embodiments, the server system 50 implements detecting audio sound patterns and notifying authorized users. While certain specific features are illustrated, those of ordinary skill in the art will appreciate from the present disclosure that some other features have not been illustrated for the sake of brevity, and so as not to obscure more pertinent aspects of the embodiments disclosed herein. To that end, as a non-limiting example, in some embodiments the server system 50 includes one or more processing units (CPUs) 501, a network interface 502, a programming interface 503, a memory 504, and one or more communication buses 505 for interconnecting these and some other components.

In some embodiments, the network interface 502 is provided to, among other uses, establish and maintain a metadata tunnel between a cloud-hosted network management system and at least one private network including one or more compliant devices. In some embodiments, the one or more communication buses 505 include circuitry that interconnects and controls communications between system components. The memory 504 includes high-speed random-access memory, e.g., DRAM, SRAM, DDR RAM or other random-access solid-state memory devices, and may include non-volatile memory, e.g., one or more magnetic disk storage devices, optical disk storage devices, flash memory devices, or other non-volatile solid-state storage devices. The memory 504 optionally includes one or more storage devices remotely located from the one or more CPUs 501. The memory 504 comprises a non-transitory computer readable storage medium.

In some embodiments, the memory 504 or the non-transitory computer readable storage medium of the memory 504 stores the following programs, modules and data structures, or a subset thereof including an optional operating system 506, a first data obtainer module 507, a second data obtainer module 508, a data transmitter module 509, a set of audio signals 510, a set of rules 511, audio signals sources 512, and a set of notifications 513.

The operating system 506 includes procedures for handling some basic system services and for performing hardware dependent tasks. In some embodiments, the first data obtainer module 507 and the second data obtained module 508 obtain data from the client devices or the audio sound monitors. To that end, in some embodiments, the first data obtainer module 507 and the second data obtainer module 508 include instructions and/or logic 507*a* and 508*a*, and heuristics and metadata 507*b* and 508*b*.

In some embodiments, the data transmitter module 509 transmits data to the client devices or the validation engines. To that end, the data transmitter module 509 includes instructions and/or logic 509*a*, and heuristics and metadata 509*b*. In some embodiments, the data obtainer modules 507 and 508 obtains the set of audio signals 510 from the audio signals sources 512. In some embodiments, the data transmitter module 509 transmits the set of notifications 513 to the data obtained modules 507 and 508 based on the set of rules 511.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and some described embodiments with some modifications as are suited to the particular use contemplated.

What is claimed is:

1. A method comprising:
at a first device including a housing arranged to hold a second device, an audio sensor, one or more processors, a non-transitory memory, and a local communication device coupled between the audio sensor and an interface to the second device, wherein the housing at least partially supports the audio sensor, the one or more processors, the non-transitory memory, the local communication device, and the interface:
receiving, using the audio sensor, an audio signal from a physical setting characterizing a user environment;
obtaining from the second device, via the local communication device, data related to input components and output components of the second device and a user of the second device;
validating the input components and the output components on the second device and authorizing the user of the second device based on the data;
determining, using the one or more processors, whether at least the audio signal includes a sound pattern that satisfies one or more criteria upon validating the input components of the second device; and
transmitting, through the local communication device, a notification to the output components of the second device indicating that the sound pattern has been detected upon validating the output components of the second device and authorizing the user of the second device.

2. The method of claim 1, further comprising:
in association with transmitting the notification, launching an application on the second device, wherein the application produces at least one of a pre-determined sound, a vibration, or a flashing light.

3. The method of claim 1, further comprising:
associating the sound pattern to a characteristic of the physical setting in the user environment.

4. The method of claim 1, wherein the one or more criteria comprise a frequency of the audio signal, an amplitude of the audio signal, a speed of sound of the audio signal, a sound pattern of the audio signal, and a direction of the audio signal.

5. The method of claim 1, wherein:
the local communication device is connected to the second device via the interface upon the housing of the first device receives and holds the second device.

6. The method of claim 1, further comprising:
forgoing transmitting the notification upon failed validation of the output components or failed authorization of the user of the second device.

7. The method of claim 1, further comprising:
attaching a third device to the housing, wherein the third device includes a second audio sensor collecting at least part of the audio signal;
establishing a secure channel between the third device and the first device; and
receiving the at least part of the audio signal through the secure channel.

8. A system comprising:
a first device, the first device comprising:
an audio sensor configured to obtain audio signals;
a non-transitory memory configured to store one or more criteria;
an interface to a second device;
a local communication device coupled between the audio sensor and the interface to the second device;
one or more processors configured to process the audio signal based on the stored criteria in the non-transitory memory including:
receiving, from the audio sensor, an audio signal from a physical setting characterizing a user environment;
obtaining from the second device, via the local communication device, data related to input components and output components of the second device and a user of the second device;
validating the input components and output components on the second device and authorizing the user of the second device based on the data;
determining whether at least the audio signal includes a sound pattern that satisfies the one or more criteria upon validating the input components of the second device; and
transmitting, through the local communication device, a notification to the output components of the second device indicating that the sound pattern has been detected upon validating the output components of the second device and authorizing the user of the second device; and
a housing arranged to hold the second device, wherein the housing at least partially supports the audio sensor, the non-transitory memory, the interface, the local communication device, and the one or more processors; and
the second device including the input components, the output components, a processor, and a communication interface connectable to the interface.

9. The system of claim 8, wherein the second device, upon receiving the notification, provides, via the output components, an output to the user of the second device.

10. The system of claim 8, wherein the first device includes a validation engine that is configured to validate the input components and the output components of the second device.

11. The system of claim 8, wherein:
the first device further includes a peripheral interface at least partially supported by the housing, and
the peripheral interface is connectable to a supplemental functional device and coupled to the local communication device and the one or more processors;
wherein the one or more processors are further configured to establish and manage a communication channel between the supplemental functional device and the second device is through the local communication device and the peripheral interface.

12. The system of claim 11, wherein the peripheral interface includes including connectors for establishing the communication channel with the first device.

13. The system of claim 11, wherein the peripheral interface includes a wireless modem operable to wirelessly communicate with the first device.

14. The system of claim 8, wherein the first device includes a validation engine, the validation engine further includes a sensor validation engine operable to validate operational integrity of a sensor of the second device by:
obtaining a first characteristic of the sensor; and
determining the operational integrity validation of the sensor based on a function of the first characteristic and a verified characteristic for the operational integrity validation.

15. The system of claim 8, wherein the first device is further configured to associate the sound pattern to a characteristic of the physical setting in the user environment.

16. The system of claim 8, wherein the first device is further configured to:
forgo transmitting the notification upon failed validation of the output components or failed authorization of the user of the second device.

17. An apparatus comprising:
an audio sensor configured to obtain audio signals;
a non-transitory memory;
an interface to a personal communication device;
a local communication device coupled between the audio sensor and an interface to the personal communication device;
one or more processors; and
a housing at least partially supports the audio sensor, the non-transitory memory, the interface, the local communication device, and the one or more processors, wherein the one or more processors are configured to:
receive, from the audio sensor, an audio signal from a physical setting characterizing a user environment;
obtain from the personal communication device, via the local communication device, data related to input components and output components of the personal communication device and a user of the personal communication device;
validate the input components and the output components on the personal communication device and authorize the user of the personal communication device based on the data;
determine whether at least the audio signal includes a sound pattern that satisfies the one or more criteria upon validating the input components of the personal communication device; and
transmit, through the local communication device, a notification to the output components of the personal communication device indicating that the sound pattern has been detected upon validating the output components of the personal communication device and authorizing the user of the personal communication device.

18. The apparatus of claim 17, wherein the notification triggers the personal communication device to provide, via the output components, an output to the user of the personal communication device.

19. The apparatus of claim 17, further comprising a peripheral interface at least partially supported by the housing, wherein:
- the peripheral interface is connectable to a supplemental functional device and coupled to the local communication device and the one or more processors; and
- the one or more processors are further configured to establish and manage a communication channel between the supplemental functional device and the second device through the local communication device and the peripheral interface.

20. The apparatus of claim 19, wherein the supplemental functional device includes a second audio sensor configured to collect at least part of the audio signal, and the one or more processors are further configured to:
- receive the at least part of the audio signal through the communication channel when the supplemental function device is attached to the housing.

* * * * *

UNITED STATES PATENT AND TRADEMARK OFFICE
CERTIFICATE OF CORRECTION

| | | |
|---|---|---|
| PATENT NO. | : 11,328,051 B2 | Page 1 of 1 |
| APPLICATION NO. | : 16/526447 | |
| DATED | : May 10, 2022 | |
| INVENTOR(S) | : Michael Fong and Neric Hsin-wu Fong | |

It is certified that error appears in the above-identified patent and that said Letters Patent is hereby corrected as shown below:

On the Title Page

In item (72) the Inventors:
Change "Nerie Hsin-Wu Fong" to --Neric Hsin-Wu Fong--

Signed and Sealed this
Thirteenth Day of September, 2022

Katherine Kelly Vidal
*Director of the United States Patent and Trademark Office*